Oct. 23, 1973   J. JONES-HINTON ET AL   3,767,740
METHOD FOR FORMING TABLE-TENNIS BALLS
Filed June 24, 1971                            5 Sheets-Sheet 1

United States Patent Office 3,767,740
Patented Oct. 23, 1973

3,767,740
METHOD FOR FORMING TABLE-TENNIS BALLS
James Jones-Hinton, Solihull, and Thomas E. H. Gray, Sutton Coldfield, England, assignors to Dunlop Limited, London, England
Continuation-in-part of application Ser. No. 722,436, Apr. 18, 1968, now Patent No. 3,617,589, which is a continuation-in-part of abandoned application Ser. No. 492,617, Oct. 4, 1965. This application June 24, 1971, Ser. No. 156,206
Claims priority, application Great Britain, Oct. 14, 1964, 41,828/64
The portion of the term of the patent subsequent to Nov. 2, 1988, has been disclaimed
Int. Cl. B29c 17/04, 17/08, 27/04
U.S. Cl. 264—27                9 Claims

ABSTRACT OF THE DISCLOSURE

A method for forming table-tennis balls from a large number of thermoplastic materials including polyvinyl chloride and terpolymers of acrylonitrile with butadiene and styrene, which includes the steps of aligning two hemispheres of a rigid thermoplastic material to form a spherical cavity, subjecting the edges of each hemisphere to a high frequency, alternating electric current to soften and adhere together the edges to form a butt-joint and forming a reinforcing bead on the inside surface of the ball around the butt-joint.

---

This invention relates to table-tennis balls.

The present application is a continuation-in-part of our application Ser. No. 722,436, filed Apr. 18, 1968, now Pat. No. 3,617,589 which was itself a continuation-in-part of our application Ser. No. 492,617 filed Oct. 4, 1965, now abandoned.

In one embodiment the invention provides a method of joining two hemispheres of a rigid thermoplastic material to form a table-tennis ball, which comprises aligning the hemispheres so that a spherical cavity is formed, and subjecting the edges of each of the hemispheres to a high frequency alternating electric current to soften said edges so that they become adhered together in the form of a butt-joint and simultaneously forcing a sufficient amount of the softened material into the interior of the cavity to form a reinforcing bead on the inside surface of said butt-joint.

In a more specific embodiment the invention provides a method of forming a table-tennis ball from two hemispheres of a rigid thermoplastic material, which comprises forming each thermoplastic hemisphere with an outwardly-extending equatorial flange, aligning the hemispheres with their respective rims and respective flanges abutting so that a spherical cavity is formed, enclosing each hemisphere in a die having a cavity of hemispherical form and size to closely contact said thermoplastic hemisphere over substantially all its external surface, subjecting the flanges and rim of each hemisphere to a high-frequency alternating electric current to soften and thereby adhere together the rims of the two hemispheres in the form of a butt-joint and simultaneously forcing a sufficient amount of the softened material into the interior of said spherical cavity to form a reinforcing bead on the inside surface of said butt-joint, any remaining external flange then being removed.

The term "table-tennis ball" as used in this Specification means a hollow ball suitable for playing the game table-tennis or ping-pong, being not less than 11.00 cm. and not more than 12.00 cm. in circumference, weighing not less than 2.00 gms. and not more than 3.00 gms., and being not more than 0.050 cm. out of sphericity as measured by the difference between the largest and the smallest diameters.

The hemispherically-cavitied dies can conveniently form an integral part of the high-frequency alternating current circuit. Thus in a preferred embodiment each die is part of a welding electrode, e.g. a cylindrical electrode, which is connected to a source of high-frequency current.

The hemispheres of rigid thermoplastic material may be formed by any convenient means, for example injection moulding, but they must be of sufficiently uniform wall-thickness to give a table-tennis ball of the desired quality and playing characteristics. The preferred method of forming these hemispheres is by a two-part vacuum-forming process, as is described in our application Ser. No. 722,436. In this two-part forming process a sheet of the desired thermoplastic material is partially formed into the desired hemispherical form on a male forming tool and is then formed into the desired hemispherical form in a female forming tool, i.e. a hemispherical mould cavity.

In the method of vacuum-forming, the sheet is caused to conform to the shape of the forming tool by softening the sheet by heating and then creating a pressure difference on the opposite surfaces of the sheet so that the pressure on the surface of the sheet contacting the forming tool is less than the pressure on the opposite surface of the sheet. This pressure difference is produced by reducing the pressure between the sheet and the forming tool and, if desired, increasing the pressure on the opposite surface of the sheet.

In the preferred two-stage vacuum-forming process, the male forming tool is maintained at an elevated temperature during partial shaping of the softened sheet, so that it is not necessary to re-heat the sheet between the two shaping operations. The second forming tool, i.e. the female forming tool, is maintained at a low temperature (it is not heated above room temperature) in order to set the shaped sheet as quickly as possible after the final shaping operation. It is of course convenient in practice to use multiple male and female formers so that each sheet is formed into a number of hemispheres in the same operation, the flange around each hemisphere being the remaining web of the sheet connecting the hemispheres together.

The thermoplastic materials used to form the table-tennis balls must be capable of being softened by the passage through them of the high frequency electric current, and for this reason the materials should have a power factor of at least 0.01, and preferably at least 0.04 when measured at room temperature using a current of 1 megacycle frequency. Examples of suitable materials are rigid polyvinylchloride, terpolymer of acrylonitrile with butadiene and styrene, blends of ethylene/vinyl acetate copolymers with terpolymers of acrylonitrile with butadiene and styrene, copolymers of diphenylol propane and epichlorohydrin, cellulose acetate, cellulose acetate butyrate, polyamides such as nylon, polycarbonates and A.S.A. (a copolymer of styrene and acrylonitrile modified with a grafted acrylic ester elastomer). Cellulose nitrate can be used in the method of the invention, but since this material is inflammable, great care must be taken to minimize the risk involved. For instance, it may be desirable to exclude air from the apparatus and to effect softening of the cellulose nitrate under an inert atmosphere such as an atomsphere of nitrogen. In view of these difficulties in using cellulose nitrate, it is preferred to use non-inflammable materials such as polyvinyl chloride.

In addition to a power factor of at least 0.01 at 1 megacycle frequency, the thermoplastic material preferably has a burning rate as determined by the method described in ASTM D-635-63 of not more than 5 inches per minute, an impact strength determined on a ½ inch x ½ inch notched bar in the Izod impact test described in ASTM D-256-56 of at least 2.5 ft. lb./inch of notch, and a water absorption of less than 0.9 percent in 24 hours for a thickness of 0.125 inch as determined by the method described in ASTM D-570. Preferably the power factor is not more than 0.050 as determined by ASTM D-150-59T.

Where the hemispheres are formed by a 2-part vacuum-forming process, the ratio of the height of the first forming tool to the height of the second forming tool is such that the resultant hemispheres in the shaped sheets have walls of substantially uniform thickness. This ratio depends on the rheological properties of the material and can thus vary from material to material and also from various blends of each material.

With most blends of polyvinyl chloride the height of the first forming tool is approximately one half the height of the second forming tool. Thus if the first forming tool is a male forming tool its height will be approximately one-quarter of the diameter of the table-tennis ball.

When the material which is used is a terpolymer of acrylonitrile with butadiene and styrene or a blend of this terpolymer with an ethylene/vinyl acetate copolymer or is a copolymer of styrene and acrylonitrile modified with a grafted acrylic ester elastomer then the height of the first forming tool is approximately seven-eighths the height of the second forming tool.

As indicated above, to form the table-tennis balls from the hemispherically shaped sheets, two such sheets are brought into contact so that the hemispherical cavities therein are aligned to form substantially spherical cavities. Alternatively, a single shaped sheet may be folded to form the spherical cavities. At this stage, the assembly is transferred to an apparatus in which it is subjected to a high-frequency alternating electric current in the regions forming the base of each hemispherical cavity. The high frequency current causes the thermoplastic material to become softened so that each pair of hemispheres become adhered together by means of a butt-joint.

As the shaped sheet is softened by the high frequency current, a controlled amount of the softened material is forced into the inside of the spherical cavity to form a reinforcing bead on the inside surface of the joint. This can be effected by designing the high frequency welding apparatus, particularly the electrodes, so that excess softened material in the region of the joint between the hemispheres is forced in a controlled manner into the inside of the resulting table-tennis ball.

During the joining together of the pairs of thermoplastic hemispheres, the hemispheres are constrained by being contained within the hemispherical die cavities. This feature of the invention is important in that it ensures uniformity of shape of the product, this being very important for a quality table-tennis ball. In a preferred embodiment of the invention, these die cavities are provided with vacuum channels so that vacuum can be applied as the thermoplastic hemisphere is fitted into the die cavity. By this means the risk of air entrapment between the wall of the cavity and the thermoplastic hemisphere can be reduced. This is clearly advantageous in that the risk of surface imperfections on the product is considerably reduced.

A suitable apparatus in which to apply the high frequency current is described and claimed in our U.S. Pat. No. 3,411,974. This apparatus comprises a pair of electrodes each comprising an open-ended cylinder having an internal diameter at the open end equal to the external diameter of a table-tennis ball, the electrodes being arranged so that the open ends of each cylinder are directly opposed, means to supply a high frequency alternating electric current to the electrodes, and means to reduce the separation of the electrodes during passage of the high frequency alternating electric current between the electrodes. The open end of each cylinder is in the form of the desired hemispherical die cavity.

In this apparatus the high frequency alternating electric current is passed through said assembled sheets which are mounted between one or more pairs of electrodes, the electrodes in each pair of electrodes being directly, opposed and contacting said assembled sheets one on each surface thereof. Preferably, the electrodes are annular, usually cylindrical, and have an internal diameter substantially equal to the diameter of a table-tennis ball, and they are so positioned that during passage of the high frequency alternating current each electrode accommodates a hemispherical projection on the assembled sheets and contacts these sheets in the regions forming the edges of the hemispherical cavities. Usually the electrodes are connected to base plates to form one or more projections on one surface of each base plate. Preferably, either the whole or only the end portion of each projection comprises an electrode.

The design of the directly opposed surfaces of the electrodes is such that it enables the correct amount of softened material to be forced into the ball to form the reinforcing bead on the interior of the joint. The design depends on the rheological properties of the materials to be welded.

In our U.S. Pat. specification No. 3,411,974 is described a design which is particularly suitable for use with hemispheres formed from polyvinyl chloride. Here, the directly opposed surfaces of the electrodes can be shaped so that they are inclined with respect to each other at an angle between them of from ½° to 7°, preferably about 3°, to enable the correct amount of softened material to be forced into the ball to form the reinforcing bead on the interior of the joint.

When the material is, for instance, a blend of an ethylene/vinyl acetate copolymer with a terpolymer of acrylonitrile with butadiene and styrene or it is A.S.A. then one of the directly opposed surfaces of the electrode (usually the lower) is flat and the other surface has a groove cut into it so that as the separation of the electrodes is reduced some of the softened material is forced between the electrodes into the inerior of the table-tennis ball to form the reinforcing bead and some of the material is forced into the groove. The depth and shape of the groove and its distance from the interior surface of the electrode determines the amount of material which is forced into the ball to form the reinforcing bead. The groove, in cross-section, is usually trapezoidal in shape. Preferably the inner wall of the groove is perpendicular to the bottom of the groove which itself is parallel to the top surface of the electrode. The outer wall of the groove is usually at an angle of between 140° and 80° with the bottom of the groove, preferably about 110°.

When the material is for instance a terpolymer of acrylonitrile with butadiene and styrene (ABS) then the electrodes are of a similar design but the electrode with the groove has a small section cut away at the top of the outer wall.

When the material, is for instance, cellulose acetate or cellulose acetate butyrate then both electrodes have opposed grooves of the type described above.

Th time for which the high frequency alternating electric current must be passed to obtain a satisfactory joint is dependent upon the particular frequency of the current and upon the particular frequency of the current and upon the temperature of the shaped sheets prior to passage of the current. For instance, when a very high freqeuncy current, e.g. 72 megacycles is used, a satisfactory joint is obtained rapidly even if the material to be welded is cold prior to passage of the current. However, when a current of frequency, for example 32 megacycles is used, the time required to produce a satisfactory joint is much greater if the material to be welded is cold than if the material is heated prior to passage of the current. In this case it is preferred to preheat the material to be welded prior to passage of the current in order that its power loss factor is increased. However, the temperature to which the material is preheated should be below the temperature at which the material becomes softened sufficiently to become deformed. When a current as low as, for instance, 15 megacycles frequency is used, then it may be essential to preheat the sheet prior to passage of the current.

Whether it is necessary to heat the shaped sheet prior to passage of the high frequency electric current depends also upon the power factor of the material of which the sheet is made. For instance, when a material having a low power factor, e.g. 0.01, when measured at room temperature using a current of 1 megacycle freqeuncy is used, then either a current of very high frequency, e.g. 72 megacycles is used, or the sheet is heated, prior to passage of the current, to increase the power factor of the sheet. However, a material having a high power factor, e.g. 0.05, can be welded rapidly at room temperature using a current of frequency as low as 20 megacycles. The frequency of the current is preferably no more than 75 megacycles.

The shaped sheet can conveniently be preheated by maintaining the welding apparatus at an elevated temperature, so that the sheet is heated by the apparatus.

The table-tennis balls are then removed from the surplus web, in other words the remaining external flanges are removed, the excess material from around the joint in each ball is removed by any suitable means, and the surface of each table-tennis ball is treated to give the desired finish by a process such as barrelling.

A method for the manufacture of a table-tennis ball will now be described by way of example only with reference to the accompanying drawings in which:

FIG. 1 shows a table-tennis ball which can be made by the method of the present invention;

FIGS. 2 to 6 inclusive illustrate various stages in the production of the table-tennis ball;

Figure 1:
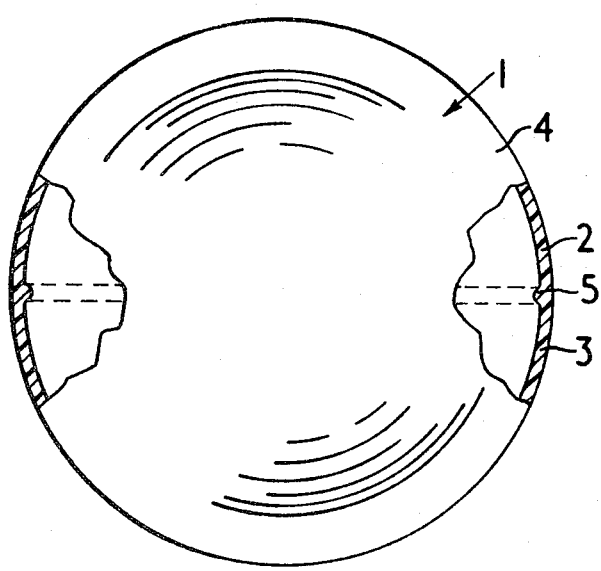
Figure 2:
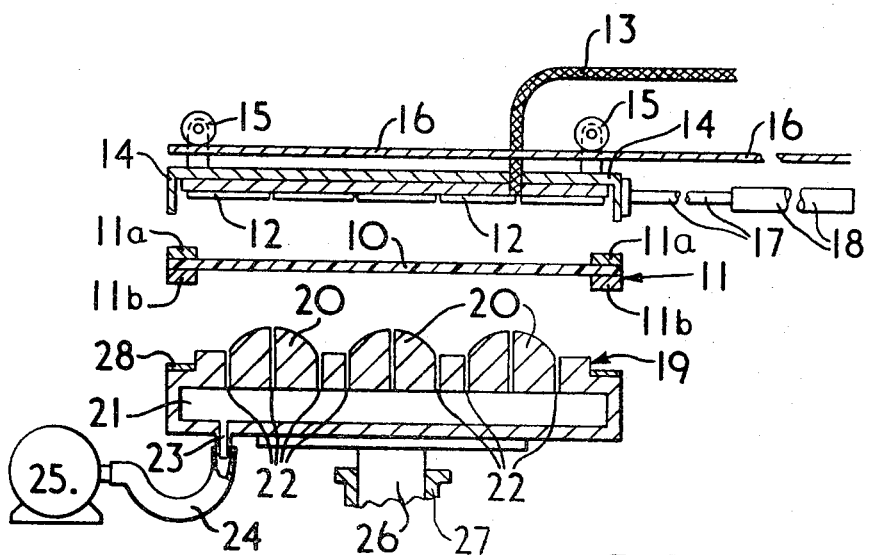
Figure 3:
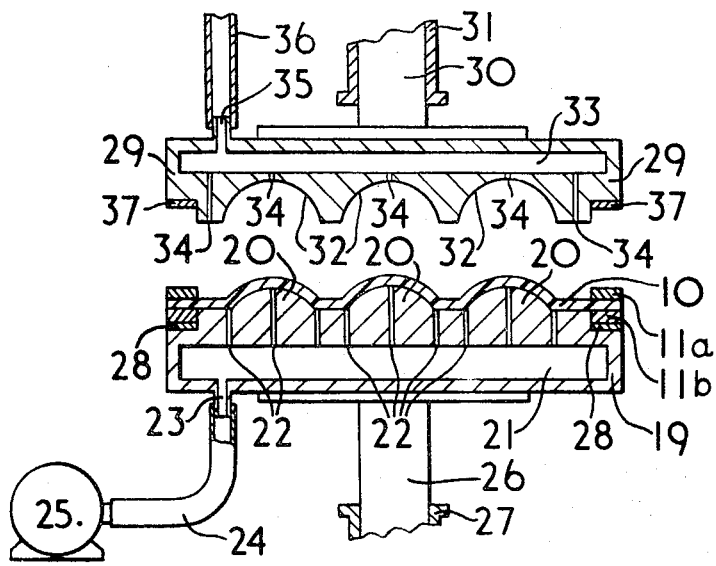
Figure 4:
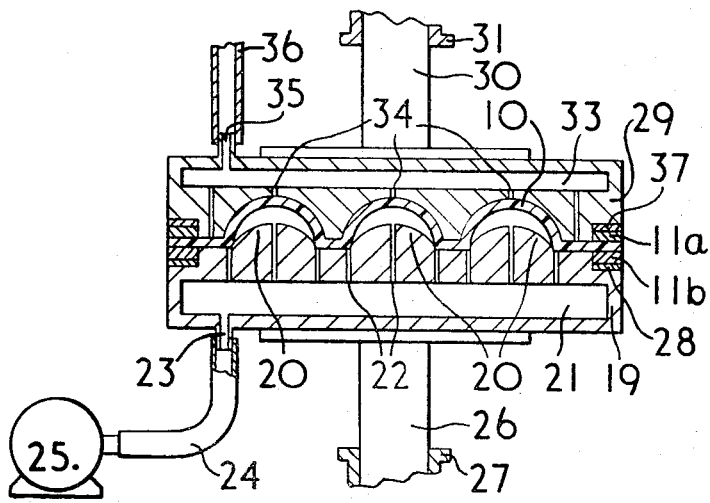
Figure 5:
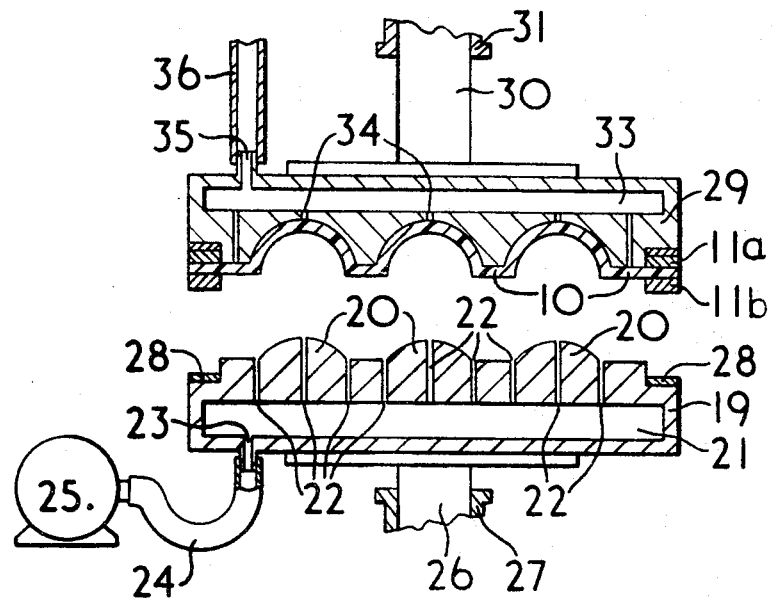

As shown in FIG. 1, a table-tennis ball 1 is formed from a thermoplastic material and consists of a sphere which was formed by butt-joining two halves 2 and 3. The table-tennis ball 1 has a smooth outer surface 4 and the walls are of substantially uniform thickness. On its internal sufacer the table-tennis ball 1 is provided with a reinforcing bead 5 at the position of the butt-joint between the two halves to strengthen this butt-joint.

Various stages of the method of manufacture of the table-tennis ball are shown in FIGS. 2 to 6 and the general method for the manufacture of the ball is as follows.

Referring to FIGS. 2 to 5, a sheet 10 having the desired thickness and made of the appropriate thermoplastic material is clamped around its periphery by a peripheral clamp 11 formed of an upper clamping member 11a and a lower clamping member 11b. An electric heating unit 12 (shown only in FIG. 2) supplied with current via a cable 13 is positioned above the clamped sheet 10. The electric heating unit 12 is mounted in a carriage 14 which is suspended on wheels 15 to be movable along a rail 16. The carriage 14 is attached to a push-pull bar 17, the operation of which, through a cylinder 18 operable pneumatically, causes movement of the carriage 14 together with the heating unit 12 to and from a position above the sheet 10.

A male forming tool 19 having a number of projections 20 on its surface is positioned beneath the clamped sheet 10. Tach projection 20 has a shape of a minor segment of a sphere, the diameter of the base of each projection 20 being substantially equal to the internal diameter of a table-tennis ball, and the height of each projection 20 being substantially equal to one-quarter of the internal diameter of the table-tennis ball. The male forming tool 19 has a cavity 21 which connects via small holes 22 with the surface of the shaping former 19 carrying the projections 20. An outlet 23 is provided from the cavity 21 which outlet 23 is connected via a pipe 24 to a pump 25 to effect withdrawal of air from the cavity 21 and through the small holes 22. The male forming tool 19 is mounted on a bar 26 slidable in the cylinder 27 to effect vertical movement of the male forming tool 19 to and from the clamped sheet 10.

The sheet 10 is heated by the heating unit 12 until it is softened sufficiently to enable it to be vacuum-formed and the heating unit 12 mounted in carriage 14 is then moved from the position above the shaped sheet 10 by operation of the push-pull bar 17. The male forming tool 19 is then moved upwardly into contact with the softened sheet 10 by effecting upward movement of the bar 26 in the cylinder 27. Preferably, the male forming tool 19 is maintained at an elevated temperature during this process, for instance 50° C. to 120° C. The periphery of the surface of the male forming tool 19 carrying the projections 20 is provided with a strip 28 of resilient material with effects an airtight seal with the clamping member 11b, and when this has been effected, air is withdrawn by pump 25 from the chamber 21 through the small holes 22 so that the soft sheet 10 is caused to be moved into forming contact with the surface of the forming tool 19.

A female forming tool 29 mounted on a bar 30 slidable within a cylinder 31 is moved into a position above the shaped sheet 10 which is held in contact with the forming tool 19. The female forming tool 29 has a number of hemispherical cavities 32 in its shaping surface and these cavities 32 are arranged to correspond to the projections 20 on the surface of the male forming tool 19. The hemispherical cavities 32 are of a size substantially equal to the external dimensions of half of a table-tennis ball. The female forming tool 29 is provided with an internal cavity 33 which is connected to the shaping surface through small holes 34, and the cavty 33 is provided with an outlet 35 which is connectable via a tube 36 to means to withdraw air from the cavity 33 and through the small holes 34. The periphery of the shaping surface of the female forming tool 29 is provided with a resilient strip 37 to form an airtight seal with the upper clamping member 11a.

After the female forming tool 29 has been moved to a position adjacent the shaped sheet 10 and airtight engagement effected with the clamping member 11a, air is withdrawn from the cavity 33 while, at the same time, the air pressure in the cavity 21 of the male forming tool 19 is increased above atmospheric pressure. In this way the sheet 10, which is still soft is caused to conform to the profile of the female forming tool 29. The female forming tool 29 is not heated to a temperature above room temperature during the shaping operation.

The male forming tool 19 is then removed from contact with the shaped sheet 10 which is held by suction in contact with the female forming tool 29 until the sheet has set sufficiently to be handled without deformation. The shaped sheet 10 is then removed from the female forming tool 29.

Figure 6:
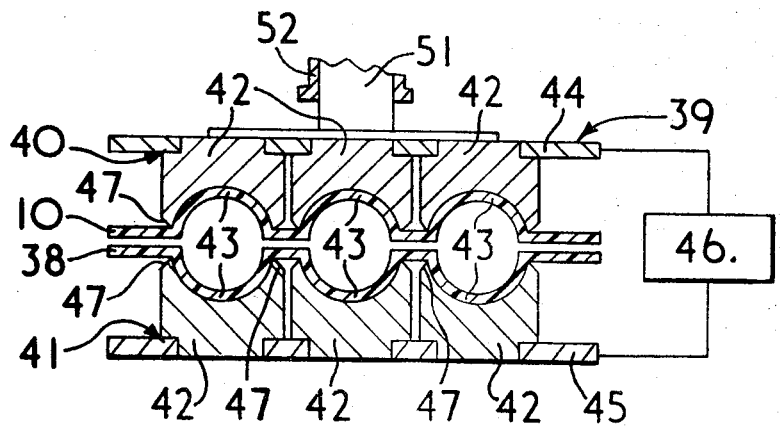

Two shaped sheets 10 and 38 are then placed in a welding apparatus 39 with their hemispherical cavities in alignment as shown in FIG. 6. The welding apparatus 39 comprises two halves 40 and 41 for contacting the assembled shaped sheets 10 and 38 one on each surface of the assembly. Each half 40 and 41 has a number of opposed cylindrical rod-like projections 42 corresponding to the number of hemispherical projections 43 on the shaped sheet 10 and 38 which are to be welded together and the end of each rod-like projection 42 is shaped to accommodate a projection 43 of the shaped sheet 10 or 38. The rod-like projections 42 are mounted on base plates 44 and 45 and the projections 42 form electrodes when the base plates 44 and 45 are connected to a source 46 of high frequency alternating current so that the shaped sheets 10 and 38 are positioned between pairs of electrodes. The periphery 47 of the rod-like projections 42 is usually chamfered at the end adjacent the shaped sheets 10 and 38 so as to produce a line of high concentration of the alternating current. In the electrodes shown in FIG. 7 the end surfaces 48 and 49 of the rod-like projections 42 in each pair of opposed projections 42 are shaped so that a V-shaped gap 50 is produced between opposed projections 42. The angle of the V-shaped gap 50 is about 3°.

Figure 8:
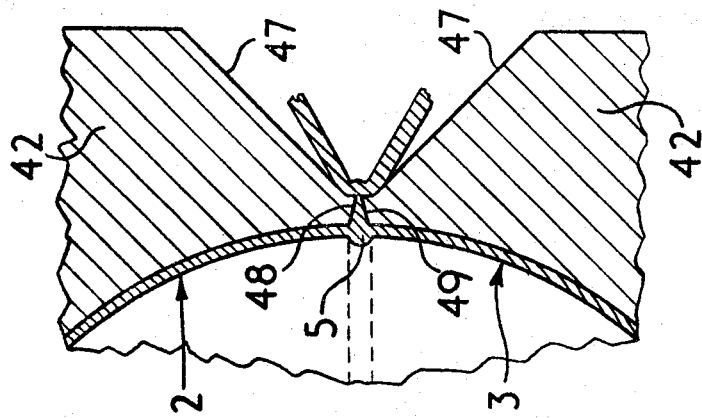
FIG. 8 illustrates the method of welding the two halves of the ball using the electrodes shown in FIG. 7.

The upper half 40 of the welding apparatus 39 is mounted on a bar 51 slidable in a cylinder 52 and when the source 46 of high frequency alternating current is connected to each half 40 and 41 of the welding apparatus, the bar 51 is moved to bring the upper half 40 of the welding apparatus closer to the lower half 41 so that only a very fine gap remains between opposed projections 42. This movement of the upper half 40 takes place as the sheets 10 and 38 are softened in the regions contacted by the electrodes due to passage of the high frequency current, and this movement of the electrodes 42 towards one another effects welding of the two hemispheres 43 where they contact one another and also forces some of the thermoplastic material into the interior of the table-tennis ball to form the reinforcing bead 5, as illustrated in FIG. 8.

When the welding of the opposed hemispheres is completed, the high frequency current is switched off and the welded sheets are allowed to cool. The table-tennis balls so produced are removed from the excess sheet material adhering to them and are subjected to treatments such as barrelling to improve their surface finish.

Figure 7:
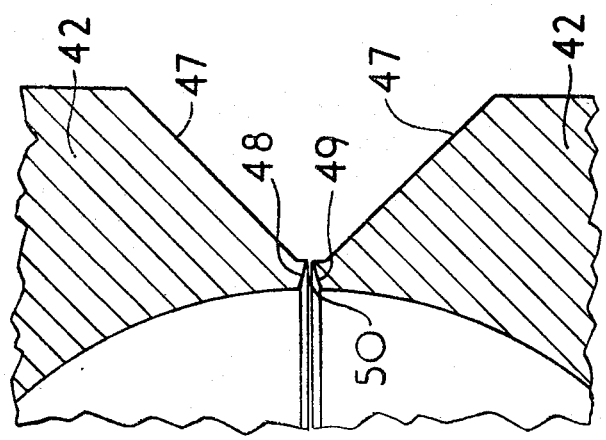
FIGS. 7 and 9 to 12 show in detail the constructions of different electrodes used in the apparatus shown in FIG. 6.

The electrode illustrated in FIG. 7 is particularly suitable for use in making balls from polyvinyl chloride.

Figures 9, 10:
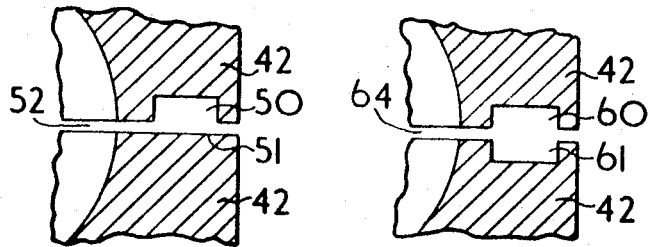

In FIG. 9 is illustrated an electrode suitable for use with hemispheres made from blends of ABS with ethylene/vinyl acetate copolymers or for use with A.S.A.

The upper opposed surface of the electrode has a groove 50 into which softened material can flow when the opposed surfaces come together. The lower opposed surface 51 is flat. The size and shape of the groove 50 determines the size and shape of the reinforcing bead which is formed at position 52 in the electrode.

FIG. 10 illustrate an electrode suitable for use with hemispheres made from cellulose acetate or cellulose acetate butyrate. This is similar to the electrode shown in FIG. 9 except that each of the opposed surfaces has a groove 60 and 61 in shape to the groove 50 in FIG. 9.

Figure 11:
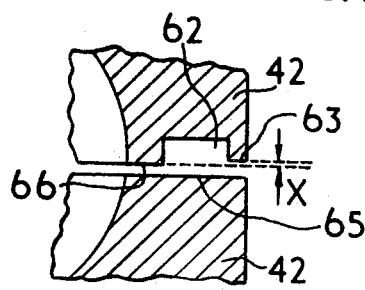

FIG. 11 illustrates an electrode suitable for use with hemispheres made from A.B.S. This is similar to the electrode of FIG. 9, except that the portion 63 is slightly shorter than the portion 66. Thus when 66 is touching the flat surface 65 there is a gap X between portion 66 and the surface 65. The gap is usually about 0.005 inch and allows softened material to flow out when the electrodes are closed together.

Figure 12:
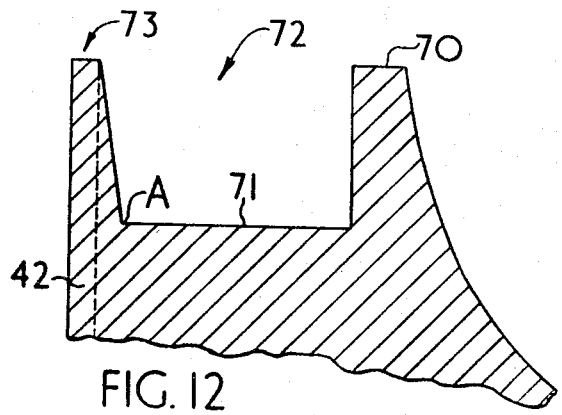

FIG. 12 is an enlarged view of a typical groove. The portion 70 may have a width of about 0.020 inch, portion 73 a width of about 0.010 inch. The bottom of the groove 71 has a width slightly less than the top 72 which is about 0.095 inch. The depth of the groove is about 0.080 inch, and the angle A is about 110°.

The invention is illustrated by the following example:

EXAMPLE

A sheet of nominal thickness of 0.030 inch of a copolymer of acrylonitrile, butadiene and styrene having a burning rate as determined by ASTM D–635–63 of 1.2 inches per minute, a power factor at $10^6$ cycles of 0.010 as determined by ASTM D–150–59T, an impact strength (ASTM D–256–56) of greater than 2.5 ft. lb./in. of notch, and a water absorption of 0.25 percent in 24 hours for a thickness of 0.125 inch as determined by the method of ASTM D–570, was shaped into hemispheres by the method and apparatus previously described. The heating unit had a power of 3 kilowatts per square foot and was positioned at 1.25 inches above the sheet. The welding electrodes were those shown in FIG. 11.

The sheet was heated for 16 seconds by means of the heating unit until it had softened sufficiently to enable it to be vacuum-formed, and the shaping former was then moved into contact with the softened sheet. The male forming tool was maintained at a temperature of 110° C. and had a height of ⅞ that of the female.

The air-pressure between the sheet and the surface of the first male shaping former was increased to 20 lb./sq. inch as the air was withdrawn from between the sheet and the surface of the female shaping former to cause the sheet to conform to the shape of the surface of the female shaping former. The female shaping former was maintained throughout at room temperature in order that the sheet was caused to set as quickly as possible after shaping.

Welding of the hemispheres was effected by subjecting them to a high frequency current of 0.70 kilowatt at a frequency of 70 megacycles/second for 8 seconds.

When the welding operation was complete, the welded assembly was allowed to cool and was then removed from welding apparatus. The table-tennis ball was removed from the web of excess sheet material, and the flashing was removed.

The example was repeated with different materials and different electrodes. When using a blend of A.B.S. with an ethylene/vinyl acetate copolymer or when using A.S.A. the welding was carried out in an electrode shown in FIG. 9.

Using cellulose acetate butyrate or cellulose acetate the welding was carried out using the electrodes of FIG. 10 and when the material was polyvinyl chloride the electrode used was that of FIG. 7.

The method of the present invention can be carried out as a continuous process using automatic machinery. It may be desirable to include in the continuous process means such as barrelling for treating the surface of the table-tennis balls, means for testing the balls with respect to weight, sphericity, bounce and balance, means for marking and grading and means for packing the balls.

The method of the present invention is advantageous in that it enables table-tennis balls to be manufactured from rigid thermoplastic materials without the necessity for having an overlap joint secured by adhesive. Substantially non-inflammable thermoplastic materials such as polyvinyl chloride and terpolymers of acrylonitrile with butadiene and styrene can be used, and this is advantageous in that the fire risk in the production and storage of the balls is greatly reduced when compared with the risks involved in the use of cellulose nitrate.

The table-tennis balls made by the method of the present invention consist of two hemispherical portions joined together by means of a butt-joint. The balls have satisfactory playing characteristics with respect to bounce, balance and weight, and they have an improved appearance compared with previous table-tennis balls since the joint between the hemispherical portions cannot be seen, and in fact is very difficult to detect.

Having now described our invention, what we claim is:

1. A method of forming a table-tennis ball from two hemispheres of a rigid thermoplastic material, which comprises forming each thermoplastic hemisphere with an outwardly-extending equatorial flange, aligning the hemispheres with their respective rims and respective flanges abutting so that a spherical cavity is formed, enclosing each hemisphere in a die having a cavity of hemispherical form and size to closely contact said thermoplastic hemisphere over substantially all its external surface, subjecting the flanges and rim of each hemisphere to a high-frequency alternating electric current to soften and thereby adhere together the rims of the two hemispheres in the form of a butt-joint and simultaneously forcing a sufficient amount of the softened material into the interior of said spherical cavity to form a reinforcing bead on the inside surface of said butt-joint, any remaining external flange then being removed.

2. A method according to claim 1, in which each of said dies is formed at one end of an electrode, said electrode forming part of the high-frequency alternating current circuit.

3. A method according to claim 2, in which the separation of each pair of electrodes is reduced during passage of the high-frequency alternating electric current.

4. A method according to claim 2, in which the directly opposed surfaces of each pair of electrodes are so shaped that the correct amount of softened material is forced into the ball to form the reinforcing bead on the interior of the joint.

5. A method according to claim 1, in which said thermoplastic hemispheres are formed by a two-part vacuum-forming process, each hemisphere being partially formed on a male former and then completely formed in a female former.

6. A method according to claim 1, in which a vacuum is applied to said hemispherically cavitied dies to facilitate location within them of said thermoplastic hemispheres.

7. A method according to claim 1, in which said thermoplastic hemispheres are formed by injection moulding.

8. A method according to claim 1, in which said thermoplastic hemispheres are heated prior to being subjected to the high frequency alternating electric current, to a temperature below the softening point of the thermoplastic material.

9. The method of claim 1, wherein said rigid thermoplastic material is a member selected from the group consisting of polyvinyl chloride, a polyamide, cellulose acetate, cellulose acetate butyrate, terpolymers of acrylonitrile with butadiene and styrene, copolymers of diphenylol propane with epichlorhydrin, blends of ethylene/vinyl acetate copolymers with terpolymers of acrylonitrile with butadiene and styrene, copolymers of styrene and acrylonitrile modified with a grafted acrylic ester elastomer and polycarbonates.

References Cited
UNITED STATES PATENTS

| | | | |
|---|---|---|---|
| 3,617,589 | 11/1971 | Jones-Hinton et al. | 264—248 X |
| 1,531,505 | 3/1925 | Roberts | 156—292 X |
| 2,378,034 | 6/1945 | Perryman | 156—292 X |
| 3,100,172 | 8/1963 | Nier | 156—292 X |

ROBERT F. WHITE, Primary Examiner

J. H. SILBAUGH, Assistant Examiner

U.S. Cl. X.R.

156—273, 292; 264—89, 92, 96, 153, 161, 163, 248; 425—109, 298, 302, 388